Dec. 30, 1930.  E. B. THOMPSON  1,786,877
CORN POPPER
Filed Feb. 20, 1928  2 Sheets-Sheet 2
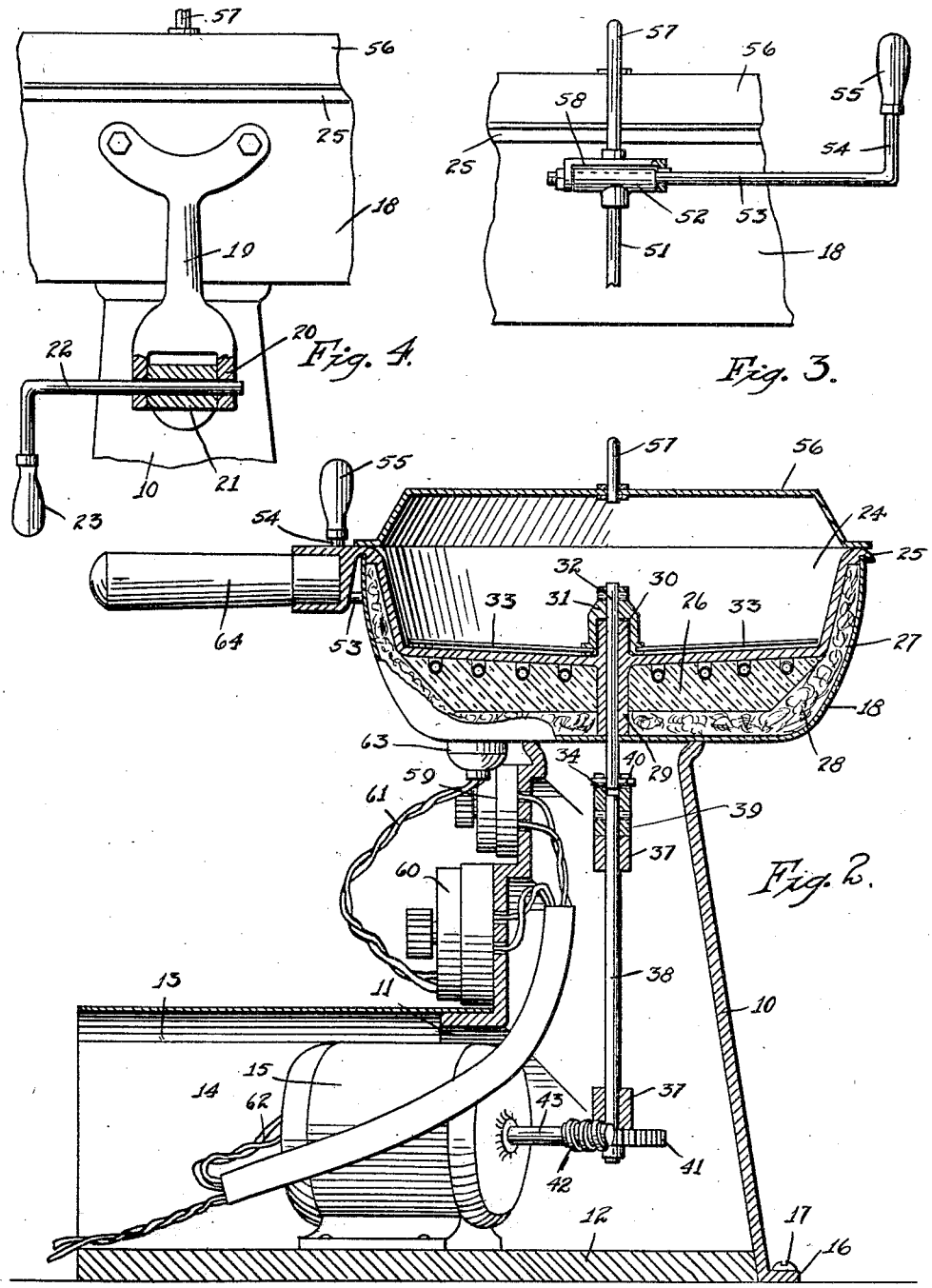

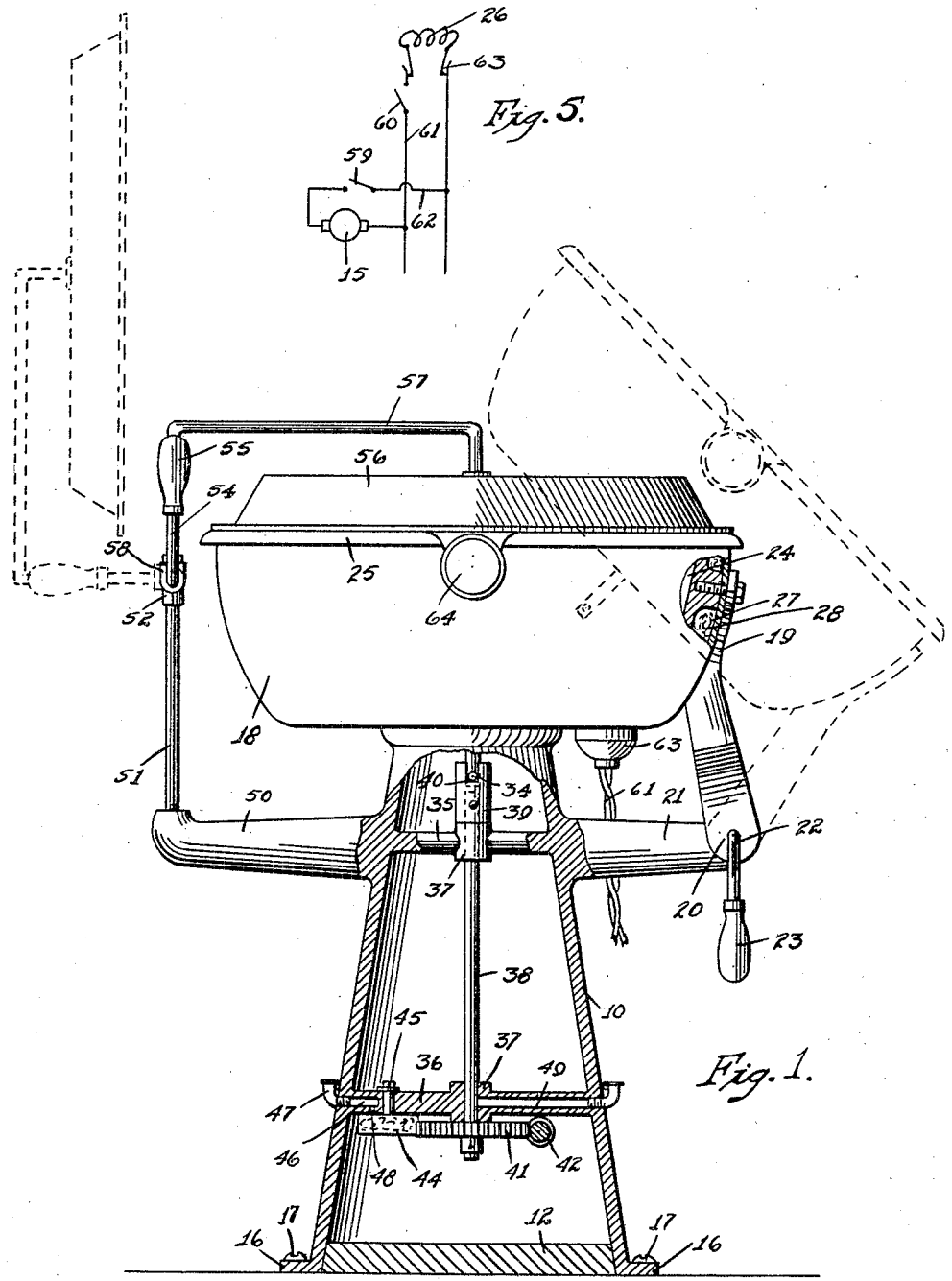

Patented Dec. 30, 1930

1,786,877

UNITED STATES PATENT OFFICE

ELMER B. THOMPSON, OF DES MOINES, IOWA, ASSIGNOR TO NATIONAL SALES AND MANUFACTURING COMPANY, OF DES MOINES, IOWA, A CORPORATION OF IOWA

CORN POPPER

Application filed February 20, 1928. Serial No. 255,648.

The object of my invention is to provide a corn popper of simple, durable and inexpensive construction, having the form of a single unit capable of being easily moved from one position to another, and employing an electric stirring mechanism and heating unit, and particularly adapted to be used on store counters.

A further object is to provide a compact corn popper having a popping kettle, including an electric heating unit and means for stirring the corn in the kettle, said popper including means whereby the kettle may be easily and quickly detached for cleaning and the like.

A further object is to provide an improved cover for the kettle.

A further object is to provide a corn popper having an upright conical base with means in the base for operating the stirring mechanism of the popper, and to provide improved means for connecting the stirring mechanism of the popper with the power means.

A further object is to provide in an electrically operated corn popper, improved means for stirring the corn within the popper.

My invention consists in the construction, arrangement and combination of the various parts of the device, whereby the objects contemplated are attained, as hereinafter more fully set forth, pointed out in my claims, and illustrated in the accompanying drawings, in which:

Figure 1 is a side elevation of my improved popper, a portion of the base and a portion of the kettle being shown in section.

Figure 2 is a vertical, central, sectional view of the same.

Figure 3 is an enlarged, detail view of the hinge mechanism for supporting the cover.

Figure 4 is an enlarged detail view of the hinge mechanism for supporting the popping kettle.

Figure 5 is a diagram of the electric circuit.

My improved popper comprises a hollow conical base 10 having an opening 11 near its bottom, and a base board 12. A hood 13 projects laterally from the opening 11 and makes connection with the base 12 to form a compartment 14 for receiving the electric motor 15. Flanges 16 are provided for permanently fastening the base to a floor or counter, if so desired, by means of suitable screws 17.

The upper end of the base 10 is open and designed to support the popping kettle 18. One side of the kettle 18 is provided with a bracket 19 which projects downwardly and outwardly and terminates in a forked portion 20 for receiving a bracket 21 from the base 10. A rod 22 is provided for pivotally connecting the brackets 19 and 21. One end of the rod 22 is bent downwardly to receive the handle 23. The rod 22 is detachably mounted so that the kettle 18 may be easily and quickly removed when so desired. The member 19 is pivotally mounted so the kettle may be swung to a position where the contents of the kettle may be emptied by gravity.

The kettle 18 is provided with an interlining or skillet 24, which has an outwardly extending flange 25 resting on the upper edge of the kettle member 18 and projecting slightly beyond the edge of the kettle so that any grease collecting on the upper edge of the skillet will drip from the overhanging edge without running down the side of the kettle. The bottom of the skillet 24 is inclined slightly downwardly and inwardly, as clearly illustrated in Figure 2, and is supported above the bottom of the kettle 18, so that an electric heating unit 26 may be supported beneath the kettle. The skillet and the heating unit are smaller than the kettle 18 so that a space 27 is provided, which is packed with heat insulating material 28.

The central portion of the bottom of the skillet is provided with a downwardly extending sleeve 29 supported on the bottom of the kettle 18 and has its upper end 30 projecting upwardly into the skillet a slight distance. The said upwardly projecting end 30 is designed to rotatively receive a hub 31 mounted on the upper end of the shaft 32, rotatively mounted in the sleeve or bearing 29. The hub 31 is provided with a series of radial wires 33 which travel close to the bottom of the skillet for the purpose of stirring the corn as the shaft 32 and the hub 31 are rotated.

The lower end of the shaft 32 projects below the bottom of the kettle a slight distance and is provided with a transversely arranged pin 34.

The base 10 has horizontally arranged bars 35 and 36. The central portion of said bars are provided with bearing members 37 for rotatively receiving a vertical drive shaft 38. The upper end of the shaft 38 is provided with a collar 39 having a transversely arranged notch 40 in its upper end for receiving the pin 34 of the shaft 32, thereby providing a clutch member for detachably connecting the shafts 32 and 38 as the kettle 18 is swung from its horizontal position to its emptying position.

The lower end of the shaft 38 is provided with a worm gear 41 driven by means of a worm 42 mounted on the motor shaft 43. The worm gear 41 is lubricated by means of a fibrous roller 44 mounted on the vertical shaft 45 supported in the bar 36. The bar is provided with a hole 46, the outer end of which is tapped to receive an elbow 47. A small hole 48 is provided in the bar 36 to permit oil from the hole 46 to drip on the wheel 44, thereby providing means for absorbing a small quantity of oil, which is delivered to the elbow 47 and distributed on the worm gear 41 by making rolling contact with the same. A second hole 49 is provided in the bar 36 for lubricating the roller bearing of the shaft 38.

The upper end of the base 10 is also provided with a laterally extending bracket 50 having an upwardly extending post 51 at its outer end which terminates in a hinge member 52. A rod 53 is rotatively mounted in the member 52 having at its outer end an upwardly projecting portion 54 for receiving the handle 55.

The kettle 18 is provided with a cover 56 which is in the form of an inverted pan. The central portion of the cover 56 is secured to a rod 57, which has its outer end projecting downwardly and terminates in a yoke 58 secured to the shaft 53 and straddles the member 52, thereby providing means whereby the cover 56 may be easily and quickly swung to an open position by rocking the handle member 55. It will be noted that the cover member swings in the opposite direction from the kettle, so that the cover does not interfere with the operation of the kettle.

The front of the base 10 is provided with switches 59 and 60. The switch 60 is supported in an electric circuit 61, which includes the heating element 26, while the switch 59 is included in the motor circuit 62 for stopping and starting the motor 15. The conductors 61 of the heating circuit include a plug 63, whereby the conductors may be quickly detached from the kettle 18 when it is desired to remove the kettle from the base. Said kettle is provided with a horizontally arranged handle 64.

Thus it will be seen I have provided a corn popper of simple construction, in which the mechanism for operating the stirring device is mounted in the base of the popper so that the entire unit may be easily conveyed from one point to another, and placed on any suitable support, such as the counter of a store. The device is so constructed that it gives a neat and attractive appearance.

In the operation of the device, the rotation of the motor shaft 43 causes the shaft 38 to rotate, which in turn rotates the shaft 32, the hub 31 and the stirring rods 33, which are caused to travel close to the bottom of the skillet 24. The bottom of the skillet is inclined downwardly toward its center, to overcome to a certain extent the tendency of the grains of corn to move toward the outer edge of the skillet, due to the centrifugal action of the corn caused by the rods 33. This also prevents the popping oil from being moved from the central portion of the skillet to the outer edges, thereby providing means whereby the upper surface of the bottom of the skillet will be uniformly covered with oil, which will be thoroughly mixed on the pop corn when placed in the skillet.

Considerable advantage is gained in forming the skillet and kettle member in a fixed unit, which includes the heating element, so that the skillet is always in the proper relation with the heating element, thereby eliminating the necessity of readjusting the parts each time the skillet is removed for emptying. The shaft 32 is disconnected from the shaft 38 by disengagement of the pin 34 from the notch 40. The switches 59 and 60 are conveniently located below the handle 64.

I claim as my invention:

1. A corn popper comprising an upright hollow conical base, a popper kettle supported on the upper end of said base, said kettle including a skillet and a heating unit, means for pivotally connecting said kettle to swing from an upright position to an inverted position, a stirring device within said skillet, electrical means supported in said base for actuating said stirring device, and means for detachably connecting the stirring device to said electrically operating means.

2. A corn popper comprising an upright hollow conical base, a popper kettle supported on the upper end of said base, said kettle including a skillet and a heating unit, means for pivotally connecting said kettle to said base to swing from an upright position to an inverted position, a stirring device within said skillet, electrical means supported in said base for actuating said stirring device, means for detachably connecting the stirring device to said electrically operating means as the kettle is moved to an open position, a cover for said skillet, and means for pivotally connecting said cover to said base.

3. A corn popper comprising an upright hollow base, a popping skillet supported on said base, a stirring device mounted in said skillet, means for operating said stirring device, comprising an upright shaft extending centrally and vertically through said base, the lower end of said shaft being provided with a worm gear, a motor shaft, a worm on said motor shaft in operative relation with said worm gear, said shaft including a clutch member for detachably connecting the stirring mechanism of said skillet with said shaft.

4. A corn popper comprising a base, combined skillet and kettle members, said skillet having its bottom inclined downwardly toward its center, an electrical heating means between said skillet and kettle members, said skillet and kettle members being pivotally supported on said base, a stirring device within the skillet, electrical means supported in said base for actuating said stirring device, and means for detachably connecting the stirring device to said electrical operating means.

Des Moines, Iowa, December 7, 1927.

ELMER B. THOMPSON.